United States Patent
Naumann et al.

(10) Patent No.: US 7,882,633 B2
(45) Date of Patent: Feb. 8, 2011

(54) METHOD FOR MACHINING SHAFT BEARING SEATS

(75) Inventors: J. Hans Naumann, Albany, NY (US); Jurgen Haberkorn, Chemnitz (DE); Matthias Hertel, Chemnitz (DE); Wolfgang Gerhard, Chemnitz (DE)

(73) Assignee: Niles-Simmons Industrieanlagen GmbH, Chemnitz (DE)

( * ) Notice: Subject to any disclaimer, the term of this patent is extended or adjusted under 35 U.S.C. 154(b) by 828 days.

(21) Appl. No.: 11/720,243

(22) PCT Filed: Nov. 25, 2005

(86) PCT No.: PCT/EP2005/012634

§ 371 (c)(1),
(2), (4) Date: Jul. 6, 2007

(87) PCT Pub. No.: WO2006/056460

PCT Pub. Date: Jun. 1, 2006

(65) Prior Publication Data

US 2008/0008550 A1 Jan. 10, 2008

(30) Foreign Application Priority Data

Nov. 26, 2004 (DE) ........................ 10 2004 057 111

(51) Int. Cl.
*B23P 15/00* (2006.01)
*B23P 17/00* (2006.01)
*B23C 3/06* (2006.01)

(52) U.S. Cl. ...................... 29/888.08; 29/558; 409/132; 409/199; 409/166

(58) Field of Classification Search ................. 29/27 R, 29/27 C, 6.01, 888.08, 557–558, 34 R, 33 C, 29/888.1; 409/131–132, 199–200, 165–166; *B23C 3/06*
See application file for complete search history.

(56) References Cited

U.S. PATENT DOCUMENTS 1,913,781 A * 6/1933 Wiley et al. .................. 409/201
3,595,131 A * 7/1971 Rozanek et al. ............... 409/84

(Continued)

FOREIGN PATENT DOCUMENTS

DE 212950 C 9/1909

(Continued)

OTHER PUBLICATIONS

International Search Report and Written Opinion from corresponding PCT/EP2005/012634 dated Mar. 13, 2006 in English.

*Primary Examiner*—Erica E Cadugan
(74) *Attorney, Agent, or Firm*—Katten Muchin Rosenman LLP

(57) ABSTRACT

Disclosed is a method for machining the bearing seats (HL, PL) of shafts (1), especially crankshafts. According to said method, the bearing seats (HL, PL) are subjected to the following machining operations after initially shaping a shaft (1) in a forging or casting process: the bearing seats (HL, PL) are preformed by cutting the same using a specific cutting edge; they are hardened; they are passed through dressing rollers; they are subjected to a preliminary rotary milling process; and they are subjected to a final rotary milling process. The preliminary and the final rotary milling process are carried out during substantially an entire rotation of the shaft (1) without longitudinally or tangentially advancing the milling cutter (12).

9 Claims, 6 Drawing Sheets

U.S. PATENT DOCUMENTS

| | | | |
|---|---|---|---|
| 3,965,780 A * | 6/1976 | Yamada | 82/106 |
| 4,384,333 A | 5/1983 | Maecker | |
| 5,235,838 A * | 8/1993 | Berstein | 72/110 |
| 5,435,674 A * | 7/1995 | Motzet et al. | 409/131 |
| 5,765,270 A | 6/1998 | Schrod et al. | |
| 6,322,300 B1 * | 11/2001 | Santorius et al. | 409/199 |
| 6,635,257 B1 | 10/2003 | Depla et al. | |
| 6,684,500 B1 | 2/2004 | Kohlhase et al. | |
| 6,698,095 B1 * | 3/2004 | Assie | 29/888.08 |
| 6,752,709 B1 | 6/2004 | Skibo et al. | |
| 2009/0116921 A1 * | 5/2009 | Naumann | 409/131 |

FOREIGN PATENT DOCUMENTS

| | | |
|---|---|---|
| DE | 3939935 A1 * | 6/1991 |
| DE | 19749939 A1 | 5/1999 |
| DE | 102004022360 | 11/2005 |
| EP | 1030755 A | 8/2000 |
| EP | 1428612 A | 6/2004 |
| GB | 1410568 A * | 10/1975 |
| JP | 2003-165011 A * | 6/2003 |
| WO | 97/32680 A | 9/1997 |
| WO | 98/00260 | 1/1998 |

\* cited by examiner

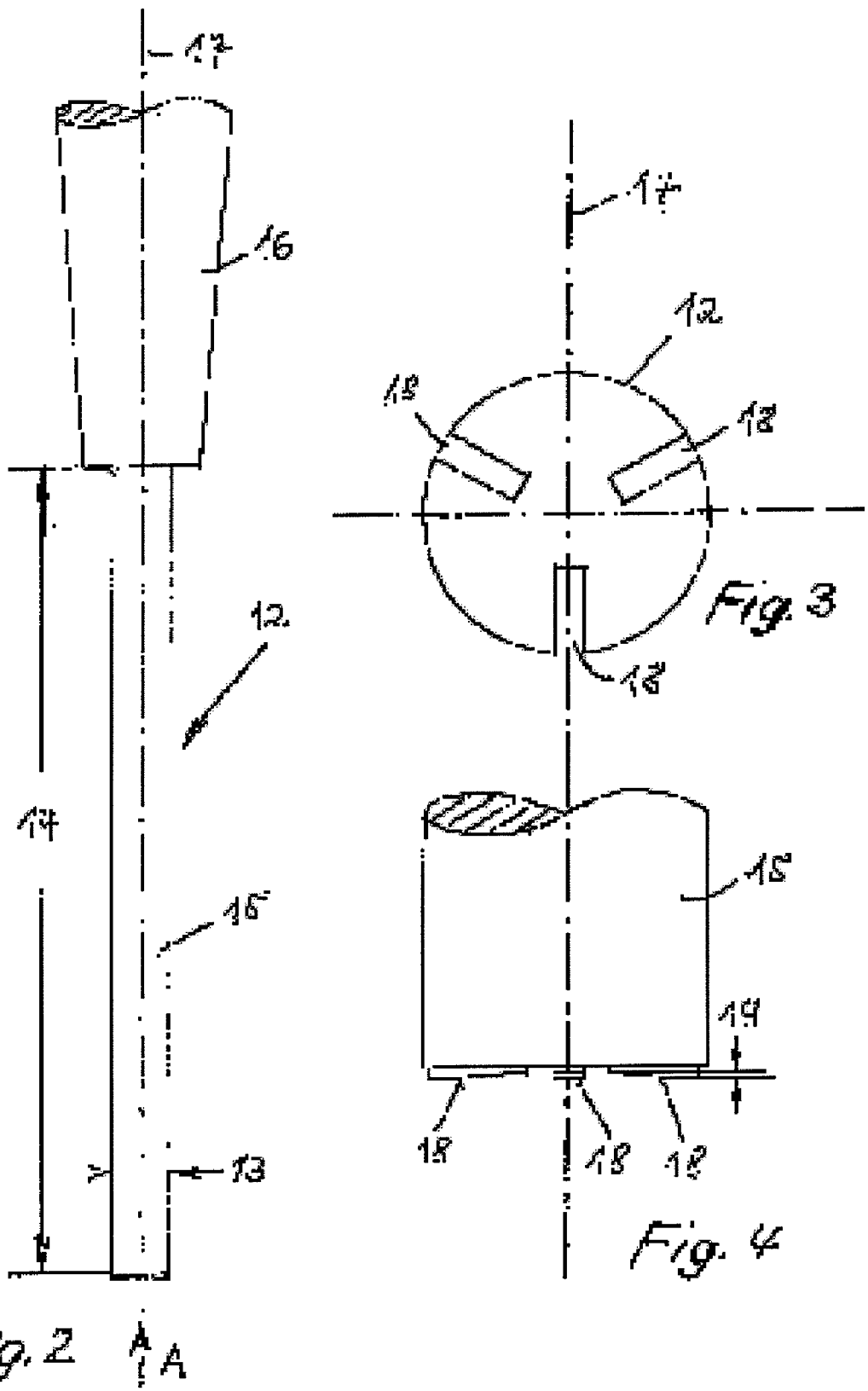

METHOD FOR MACHINING SHAFT BEARING SEATS

The invention relates to a method for machining the bearing seats of shafts, especially of crankshafts, wherein the bearing seats are subjected to a plurality of machining operations after a shaft has been initially formed by forging or casting.

The bearing seats of shafts, such as the seats of the main bearings and of the thrust bearings of crankshafts, are usually machined by multi-stage chip-removing processes. According to a typical machining sequence, the forged or cast crankshaft is first rough-machined by turning, milling or turn broaching, then semifinish-machined by grinding and finally subjected to finish machining. In particular, in order to protect the bearing seats in the course of further manufacture, these are hardened and then ground, since for many years grinding was the only usable method for reducing bearings to their final dimensions after they had been hardened.

Rotary milling of the bearing seats has also been proposed repeatedly, as has already been done in DE 212950 and AT 286067, for example. In such a case, a milling cutter turning around an axis of rotation disposed perpendicular to the axis of the bearing seat to be machined is moved with tangential feed along the rotating workpiece, in order to avoid wet grinding.

For example, WO 97/32680 A1 proposes a method without wet grinding for machining bearing seats of crankshafts, wherein the crankshaft is rotated at approximately 20 to 100 rpm by means of a holding fixture in which it is clamped and mounted so as to be driven in rotation around its longitudinal axis, which coincides with the C axis of the machine, and is machined with a milling tool, which can be rotated around its A axis (which is parallel to the X direction of the machine) in a tool spindle, can be infed to the workpiece along its axis and can be fed perpendicular to its axis (in Y direction of the machine; tangentially relative to the workpiece). The corresponding machining takes place in two stages.

According to the associated explanations (see page 11, lines 11 to 25), in order to allow for the different stresses and strains on the cutting tool and the quality to be achieved by the machining operation, the tangential feed rate is controlled in such a way that the circumferential cutters of the milling tool have optimal cutting conditions during the rough-machining phase (roughing) and that the end blades can act on the entire running seat during finish-machining (smoothing) of the running seat. Accordingly, the high cutting speeds necessary for high-speed cutting can be achieved by appropriately high speeds of revolution of the rotary milling tool, while the crankshaft can nevertheless be rotated at the usual speed of up to approximately 100 rpm, as is also used during grinding in order to achieve high quality of the workpiece (see page 4, line 27 to page 5, line 9). Because of the high cutting speeds, the stresses and strains on the workpiece are supposedly small and very good three-dimensional geometry can be achieved. When the tool is matched to the contour of the bearing seat, the tangential feed of the rotary milling tool permits machining of the entire width of the bearing seat in one work cycle. The steps of rough machining and grinding machining of the bearing seats could be combined—in one machine and with one clamping of the crankshaft—in one working step, and so considerable streamlining could be achieved. On the milling tool, there are provided three cutting tips made of common types of cutting materials and equipped respectively with an end cutter and a circumferential cutter. The cutting tip geometry is adapted to the geometry of the bearing seat to be machined as regards transition radius, flat shoulders, etc. (see page 6, line 33 to page 7, line 5).

In view of the throw height of the crankshaft, the known rotary milling tool must be very elongated (protruding length) to ensure that it can undertake machining of the bearing seat (see page 8, lines 18 to 20).

In summary, there are proposed in WO 97/32680 a method and a device that permit short cycle times and very good quality during machining of the (unhardened) bearing seats of crankshafts by using high-speed rotary milling, so that grinding can be made completely unnecessary (see page 15, lines 22 to 27).

From EP 1030755 B1 there is known the machining of crankshafts by the following sequence of machining steps: chip removal—hardening—chip removal—finishing. In this connection, it is explained that the bearing faces are hardened in their near-surface zones, especially in the case of steel crankshafts. This serves the purpose of increasing the wear resistance of the bearing locations, preventing damage during handling throughout the entire manufacturing process, and influencing the strength characteristics of the crankshaft (see column 1, lines 23 to 30). The starting point of the ideas is the conventional machining of crankshafts in four steps: The first step is chip-removing machining with specific cutters; in this connection there is also mentioned rotary milling, and in particular high-speed milling. In the subsequent second machining step, the bearing face of the crankshaft is hardened. The third step relates to grinding by means of a hard, massive grinding tool, such as a grinding wheel. Finally, in the fourth step, finishing is achieved by a stationary grinding belt or grindstone, which is pressed against the outer circumference of the rotating bearing location of the crankshaft. The material allowance abraded during finishing ranges from 1 to 10 μm (see column 2, line 32 to column 3, line 15).

In order to lower the costs of crankshaft machining, it is endeavored to reduce the machining of the bearing locations from four to three different machining steps (see column 3, lines 21 to 24). By omitting machining by grinding, the machining sequence is reduced from four to only three machining steps that are different in principle. Consequently, disposal problems for elimination of grinding sludge should cease to exist, investment costs for grinding machines and costs for tool consumption would no longer be incurred, and a larger inventory of workpieces would no longer be needed to compensate for the prolonged turnaround time of the workpieces caused by grinding. In contrast, disposal of the chips from chip-removing machining causes no problems, since either dry cutting will be possible (high-speed milling) or complete separation of chips and oil can be achieved because the specific surface of the chips is much smaller than that of grinding dust (see column 4, lines 21 to 33).

A further consideration relevant to the grinding of bearing locations that has been practiced heretofore is that the roundness deviations resulting from chip-removing rough-machining are usually reduced only in their absolute size but not in their nature by grinding. Thus grinding will not reduce long-period roundness deviations to short-period roundness deviations, but instead the number of undulations in the shaft will either remain the same or decrease, with the consequence that further improvement of the roundness deviations by finishing, considered as an improvement in the result per unit time, will actually become more difficult (see column 7, line 49 to column 8, line 3).

According to EP 1030755 B1, hardening is followed by more material removal by chip-removing machining, especially the second chip-removing machining step (finish chip removal) of a two-stage metal-cutting operation (see column 9, lines 20 to 24).

What is common to the comments in WO 97/32680 A1 and EP 1030755 B1, therefore, is that multi-stage rotary milling machining of the bearing seats by wet grinding should be avoided. In this way, as explained, the quality of manufacture could be increased and the costs incurred due to the elimination of grinding sludge could be lowered for both unhardened and hardened bearing seats. The unanimous, known interpretation is that multi-stage rotary milling machining should be integrated into rough-machining. This interpretation is not invalidated even by the fact that, as the possible combination of machining sequences up to the ready-to-use condition of a crankshaft, there is mentioned the following: chip removal—hardening—chip removal—finishing (see EP 1030755 B1 column 4, lines 50 to 54).

However, the invention is not anticipated even by DE 19749939 A1. To the contrary, that document refers to "two method groups" (see column 5, line 31), in which the cutting speed "is produced primarily by the rotation of the workpiece" and also "is produced primarily by the rotation of the tool" (see column 9, lines 38 to 43). In the present invention, there are no method groups and also no different cutting speeds.

In DE 19749939 A1, operation may well take place with the end cutters of a milling finger (12) (see claim 19), and "two headstocks (4, 5) may well be used for clamping and synchronously driving the ends of the crankshaft (20): (see claim 21).

Therein, however, the comparability of DE 19749939 with the present invention is already exhausted. In DE 19749939, no one thought of undertaking precision machining of the bearing seats of the main and thrust bearings of a crankshaft by rough rotary machining and finish rotary machining, although the device (machine) known therefrom would already have been capable of doing so.

Above and beyond DE 19749939, it can be observed from the prior art that orthogonal rotary milling of the bearing seats of crankshafts with a milling finger is nothing new at all. For example, older documents such as the following contain such information:

AT 286067 (D2 in the search report),
DE 212950 (D8 in the search report) and
WO 97/32680 (D7 in the search report).

What is entirely decisive is in which machining operation the milling finger is operated and how it is operated Just as in DE 19749939, the device of DE 4446475 A1 satisfies all prerequisites for machining a crankshaft within the meaning of the present invention. In DE 4446475, the milling finger (5) can be swiveled around an axis (17) that runs parallel to the axis of rotation (3) of the crankshaft (1) (see FIGS. 2a, 2b, 2c and 5). The present invention is undoubtedly not directed at swiveling capability of the milling finger. To the contrary, it is immersion and retraction of the milling finger that are specially addressed in the present invention (see Application, FIG. 5a and associated description, page 21, paragraph 2 to page 22, paragraph 1).

However, variability of the movement of the milling finger in the X and Y direction is also expressly addressed in DE 4446475 (see column 2, lines 27 to 43 and FIGS. 1a to c). It is mentioned that "the introduction of radial forces can be minimized" by appropriately controlling the milling finger in the two aforesaid directions (see column 2, lines 55 to 65 and FIG. 4). In this way there is presumably obtained a machining pattern comparable with the result of a machining step according to the present invention. Control of the milling cutter in the X and Y direction is also claimed in generalized form (see column 7, lines 30 to 40).

However, whether the person skilled in the art, without doing anything inventive, could then have arrived at a milling cutter movement according to FIG. 5a of the present invention or could have found the same by experiments remains questionable here. In any case, the milling cutter movement within the meaning of FIG. 5a is not specifically indicated in DE 4446475. There is also no mention of rough rotary milling and finish rotary milling for precision machining.

DE 102004022360 A1 is indeed older than the present invention, but was not published as a priority document over it; thus it does not represents a senior right.

DE 102004022360 relates to the configuration of the end cutters (17, 18) of a milling finger (1) for ultra-precision finish-machining of cylindrical faces (22) of a crankshaft (20). The end cutters are formed in such a way that dry machining with small cutting forces can be undertaken (see Par. [0019] and claim 1). However, this relates only to finish rotary milling within the meaning of that specific invention. As examples of finish machining within the meaning of rough rotary machining as defined in the present application, there are intended turn broaching, milling or turning (see Par. [0018]). Ultra-precision finish machining is followed by finishing (see Par. [0018]).

DE 102004022360 imparts a teaching entirely different from that of the present application to the person skilled in the art. There is no verbatim mention of rough rotary milling with a milling finger. It is also not indicated how the milling finger is to be moved toward and back away from the workpiece within the meaning of FIG. 5a of the present application.

The teaching of DE 102004022360 substantially amounts to no more than the configuration of the end cutters (17 and 18), and this again is different from the configuration (19) of the end cutters (18) of the present application (see FIGS. 3, 4 and 5).

The present invention is based on the knowledge that, starting from the structural complexity of crankshafts and other shafts with bearing seats, especially with eccentric bearing seats, optimization of manufacturing costs and working result cannot be achieved with the known measures alone. Its object is to provide a method for machining the bearing seats of shafts in a manner than contributes to manufacture of shafts having stringent quality requirements at comparatively low costs.

This object is achieved according to the invention by a method for machining the bearing seats of shafts, especially of crankshafts, wherein the bearing seats are subjected to the following machining operations after a shaft has been initially formed by forging or casting:

rough-shaping by chip-removing machining with specific cutters,
hardening,
passing through dressing rollers,
rough rotary milling and
finish rotary milling, in which the rough rotary milling and the finish rotary milling are respectively applied substantially during one complete revolution of the shaft, without longitudinal feed and without tangential feed of the milling cutter, and the infeed of the milling cutter during immersion at the beginning of rough rotary machining and at the beginning of finish rotary machining has only an axial component relative to the axis of the milling cutter. According to the invention, therefore, hardening of the bearing seats is followed by a multi-stage process of chip-removing machining with specific cutters, wherein rotary milling takes place in rough-cutting and finish-cutting steps, and the position of the milling cutter does not change relative to the axis of the bearing to be machined during a respective revolution of the shaft, or in other words between the lead-in cut and the exit of the milling cutter. By virtue of the hardness of the material to be removed and the multi-stage nature of the rotary milling machining, only relatively small, stress-annealed chips are produced, and they can be disposed of in dry condition and without problems. By the fact that the crankshaft is rotated substantially only by approximately one complete revolution during rough rotary milling and also during finish-rotary milling respectively, which includes rotation of the shaft by approximately one and one half complete revolutions, as will be explained in more detail hereinafter, the rotary milling machining can be accomplished within a minimal time.

During rotary milling machining, the axis of the rotary milling tool is offset relative to the axis of the bearing seat to be machined by an eccentricity, which is retained or in other words is constant including the phases of immersion and retraction of the tool. By the fact that a feed movement of the milling cutter transverse to its longitudinal axis, or in other words in Y direction or tangentially relative to the workpiece, does not occur during rotary milling machining, the machining speed (relative feed) is guided alone by the circumferential velocity of the crankshaft and the radius of the bearing seat to be machined. In this connection, the following machining speeds are achieved: Relative feed between approximately 200 mm/min and 9000 mm/min, preferably between approximately 600 mm/min and 1500 mm/min; cutting speed approximately between 60 m/min and 600 m/min, preferably between approximately 80 m/min and 120 m/min. The offset of the axis of the milling cutter relative to the axis of the bearing seat to be machined depends on the bearing geometry and corresponds to 0.1 to 0.25 times the value, preferably 0.15 to 0.2 times the value of the diameter of the milling cutter. Because of the eccentricity of the milling cutter, the end cutters can embrace the complete bearing seat. The eccentricity can be optimized to reduce the vibration behavior. The shaft can be rotated in the direction of the eccentricity or in the opposite direction during rotary milling machining.

According to a preferred embodiment, the workpiece is gauged after rough rotary milling and the infeed of the milling head for finish rotary milling is determined as a function of the result of this measurement. This gauging of the bearing seats after rough rotary milling is performed on the clamped shaft, so that rough rotary milling, gauging and finish rotary milling take place in a direct sequence. An equally large or a different machining allowance of the machining face can be removed during the individual steps of rotary milling machining of the bearing seats. The second option is particularly favorable, in that approximately 60 to 80% and preferably approximately 65 to 75% of the machining allowance remaining after hardening, is removed during rough rotary milling and the rest is removed during finish rotary milling.

Depending on the requirements of surface quality as well as on other boundary conditions, rotary milling may or may not be followed by finishing of the bearing seats. From cost viewpoints, a procedure without finishing is preferred. This is also feasible in principle, since the surface irregularities still present after finish rotary machining run transverse and not parallel relative to the direction of movement in the bearing. Thus they are evened out more rapidly during operation, and the danger that the lubricant film will break away from them locally is smaller.

According to another preferred improvement of the invention, the infeed of the milling cutter during immersion at the beginning of rough rotary milling and at the beginning of finish rotary milling respectively has only an axial component relative to the axis of the milling cutter. in each case this milling cutter is infed along its longitudinal axis and bears radially on the workpiece, while the shaft is being rotated by a certain amount (see hereinafter). This is advantageous in preventing the production of a "dent" in the material to be removed during immersion of the milling cutter. Because denting is avoided in this way, the machining allowance existing before rotary milling can be correspondingly small (for example, only 0.35 mm), which is favorable for the economy of multi-stage rotary milling machining. It has proved particularly favorable when immersion of the milling cutter in the material to be removed, at its position that is critical for rough rotary milling, extends over an angle of rotation of approximately 3 to 15°, particularly preferably approximately 5° in the crankshaft. An analogous condition applies for immersion of the milling cutter during finish rotary milling.

Another preferred improvement of the invention is characterized in that the diameter of the milling cutter used for rotary milling is larger than the width of the bearing seat to be machined. Preferably, the diameter of the milling cutter used for rotary milling is approximately 1.15 to 1.35 times the amount of the width of the bearing seat to be machined. In this case, a relief groove in which the milling cutter can run out during rotary milling machining is expediently made during rough-shaping on both sides of the bearing seat to be produced. Taking these parameters into consideration, the profile of the irregularities remaining on the surface of the bearing seats after rotary milling machining is favorable for maintaining a lubricant film.

During machining of the bearing seats of a crankshaft, it is advantageous for the crankshaft to be clamped for multi-stage rotary milling machining at its flange end in a first rotatable chuck and at its journal end in a second rotatable chuck. Both of these chucks can be driven synchronously and rotated with a speed of revolution of between 1 and 100 rpm.

The bearing seats of the individual main bearings of a crankshaft are expediently machined successively with a single rotary milling tool, while the crankshaft is braced simultaneously in radial direction by one or by two steadies on at least one adjacent main bearing. By bracing with steadies, it is ensured that the crankshaft will not bow under the machining forces and that the machining result will not be impaired.

In analogous manner, the bearing seats of the individual thrust bearings are machined successively with a single rotary milling cutter, while the crankshaft is braced simultaneously in radial direction by a steady on at least one adjacent main bearing. Alternatively, a plurality of main or thrust bearings may each be machined simultaneously with a plurality of rotary milling tools. An appropriate plurality of rotary milling tools is provided for this purpose.

During multi-stage rotary milling machining of each bearing seat, its own individual NC control program is running. A prerequisite for such individual control is the existence of measuring devices and measuring programs, with which the machining result of rough milling machining is recorded directly and used in the NC program of the machine for machining the bearing seat in question during finish rotary milling machining. As explained, the measurements are made after the rough cutting step of multi-stage rotary milling machining, and then infeed is undertaken for the finish-cutting step. By virtue of recent developments, such complex NC control of the machining machine is now possible without difficulty.

The invention also relates to a machine tool for performing the method. The machine tool possesses:
- a main spindle and a counter spindle with an axis of rotation (C axis) in Z direction, corresponding to the main axis of rotation of a shaft to be machined,
- a chuck that can be driven in rotation around the C axis,
- at least one tool spindle that can be rotated around the A axis, which runs parallel to the X direction, and that can be displaced and positioned in Y direction and in the X, Y, Z direction,
- a Y axis for adjustment of the eccentricity of the milling cutter by an amount e relative to the axis of rotation of the shaft
- at least one steady that can be displaced or immobilized along the Z direction and that has at least one bracing point for the shaft at one of its bearings,
- a counter spindle with a lathe center with a second chuck and
- a positionable measuring device for recording the geometric actual values of the machining faces.

During machining of the bearings of a crankshaft in a machine with two chucks that can be driven in rotation, the first chuck holds the crankshaft at its flange end and the second chuck holds the crankshaft at its journal. In each case, the crankshaft is clamped with its axis of rotation along the C axis (in Z direction) of the machine tool.

The axis of rotation (A axis) of the tool spindle containing the rotary milling tool runs parallel to the X direction of the machine, which in turn runs orthogonally relative to the Z direction. The tool spindle for the rotary milling tool is also provided with a device in order to make the tool spindle adjustable for adjusting the eccentricity (the offset) between the axis of the bearing to be machined and the tool axis in the Y direction of the machine. Finally, the tool spindle can also be displaced and immobilized in the Z direction of the machine tool, in order that the individual bearing seats can be machined in succession.

The machine controller permits an infeed movement of the rotary milling tool comprising both an axial component (in X direction) and a radial component (in Y direction) during immersion in the bearing location at the beginning of rough rotary milling and of finish rotary milling.

For machining of seat faces of thrust bearings, the tool spindle is provided with a device allowing it to oscillate in coordinated manner in the direction of the X axis and of the Y axis, so that it can follow the circular movements of the thrust bearing during rotation of the crankshaft around its main axis.

The tool spindle is equipped to hold a milling finger, whose shank has a length-to-diameter ratio ranging between 10:1.5 and 10:3. Such slenderness of the milling finger is the prerequisite for all bearing faces (generated faces) to be machinable with the tool while the crankshaft is rotating. Another prerequisite for slenderness, however, is that the shank of the milling finger has high flexural strength. It is advantageous for the shank of the milling finger to be made of hard metal—or other materials with high flexural strength. The milling finger is preferably clamped in a shrink-fit chuck.

To achieve steady and uniform cutting, at least three end cutters comprising CBN (cubic boron nitride) cutting tips fixed by solder or other means or also comprising one cutting tip made of a suitable other cutting material are provided on the finger cutter.

The cutting tips each have a chamfer, so that the height of the cutting edges above a normal plane decreases by a small amount from the outside circumference of the milling finger to its axis. By such a chamfer it is possible to achieve a favorable convex (crowned) form of the bearing faces for crankshafts. This chamfer of the end tool cutters, produced by surface grinding, can be approximately 0.04 to 0.1 mm. Preferably the ratio of the speeds of the chuck or chucks to the speed of the tool spindle can range from 1:400 to 1:2000. The cutting speeds are preferably on the order of magnitude of between 80 and 600 m/min. If necessary, the tool can be cooled internally.

Bracing of the respective bearing seats not currently being machined by a steady (see above) is expediently achieved on a main bearing, at three points, one of which lies in the X direction (relative to the rotary milling tool). In order to preclude disturbances of bracing by the necessary oil bores in the main and thrust bearings, the bracing faces of the steady are designed as sliding blocks, which in the region of the oil bores of the main-bearing seats each have a recess in the form of a groove. In addition, the sliding blocks can be adapted to the surface contour of the generating line of the bearing, especially via hollow grinding matched to the bearing diameter. This prevents ingress of chips in the region of the bracing of the shaft on the sliding block or steady in question, and in this way it prevents damage to the bearing used for bracing the shaft.

The special advantages of the present invention are evident for crankshafts whose bearing seats are hardened.

The invention will be described in more detail hereinafter with reference to a practical example.

In the drawing, which is not to scale and in some cases is greatly simplified,

FIG. 2 shows a side view, on a smaller scale, of a rotary milling tool,

Figure 5:
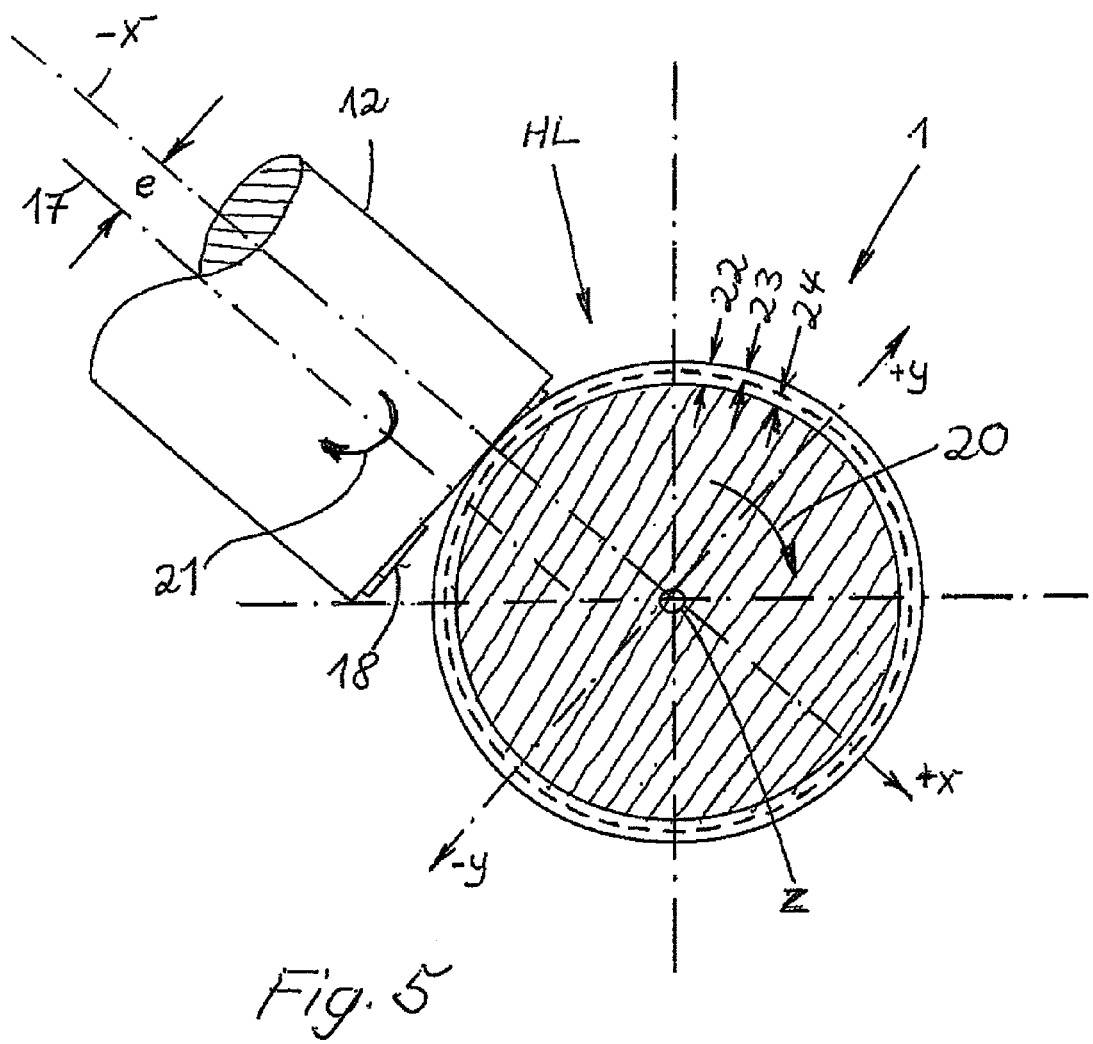
Figure 5A:
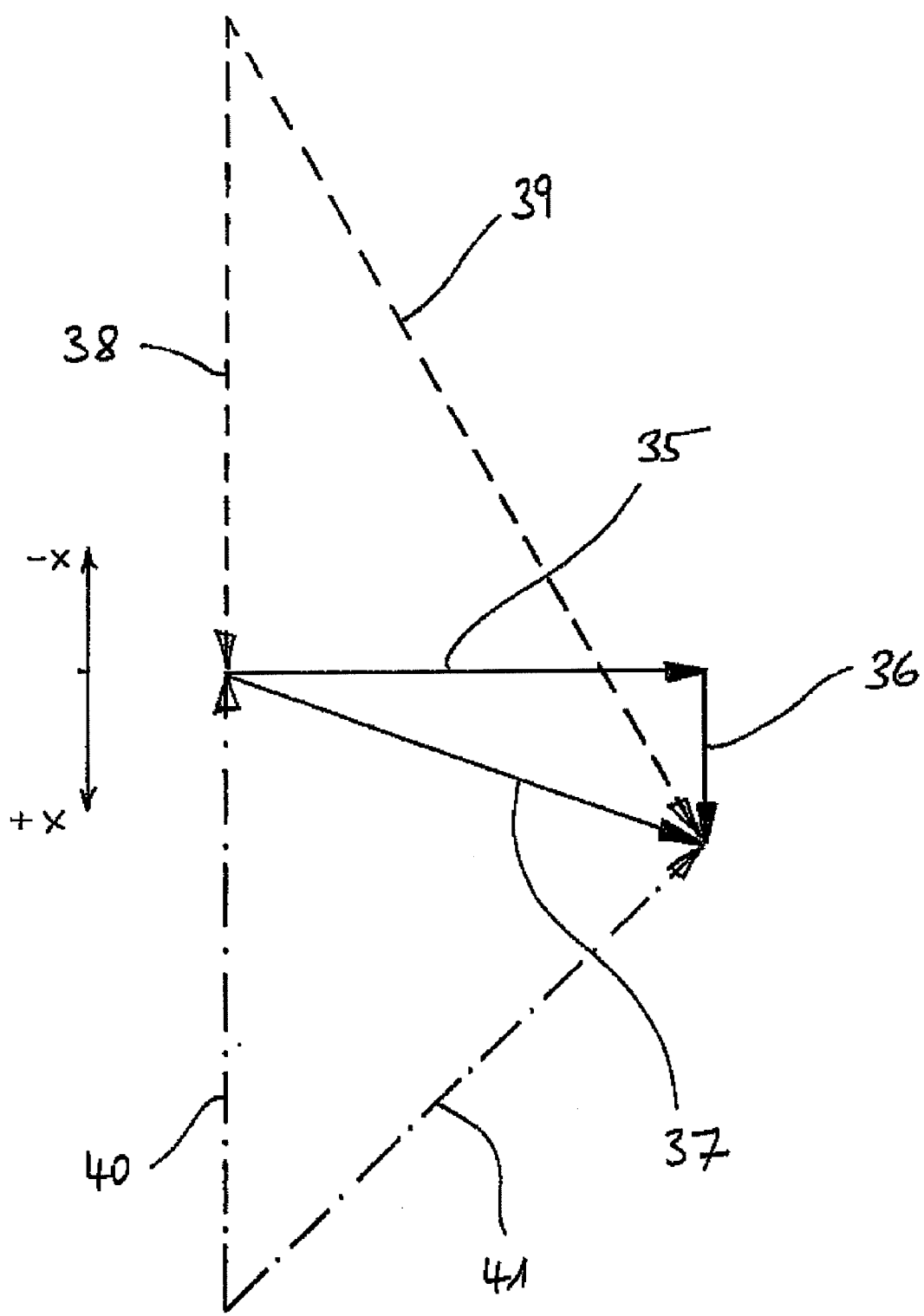
Figures 6, 7:
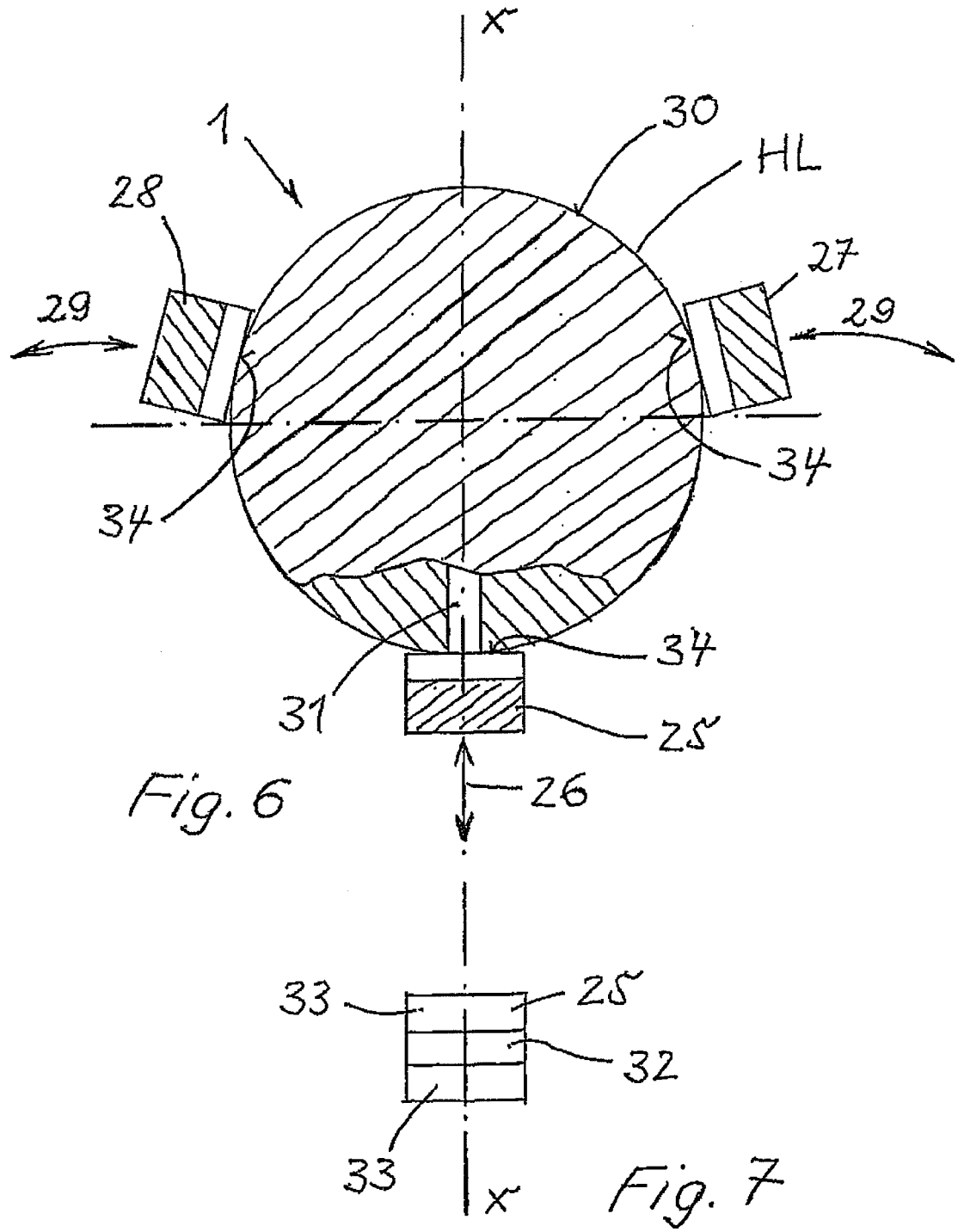

FIG. 3 shows an overhead view, in the direction of arrow A of FIG. 2 and on a larger scale, of the rotary milling tool of FIG. 2, FIG. 4 shows a side view, on a larger scale, of the axial end of the rotary milling tool, FIG. 5 shows a cross section of the machining of a main bearing, FIG. 5*a* shows a vector diagram of the relative feed during various phases of rotary milling machining, FIG. 6 shows a cross section of the bracing of a main bearing, and FIG. 7 shows the overhead view of a sliding block of the steady.

Figure 8:
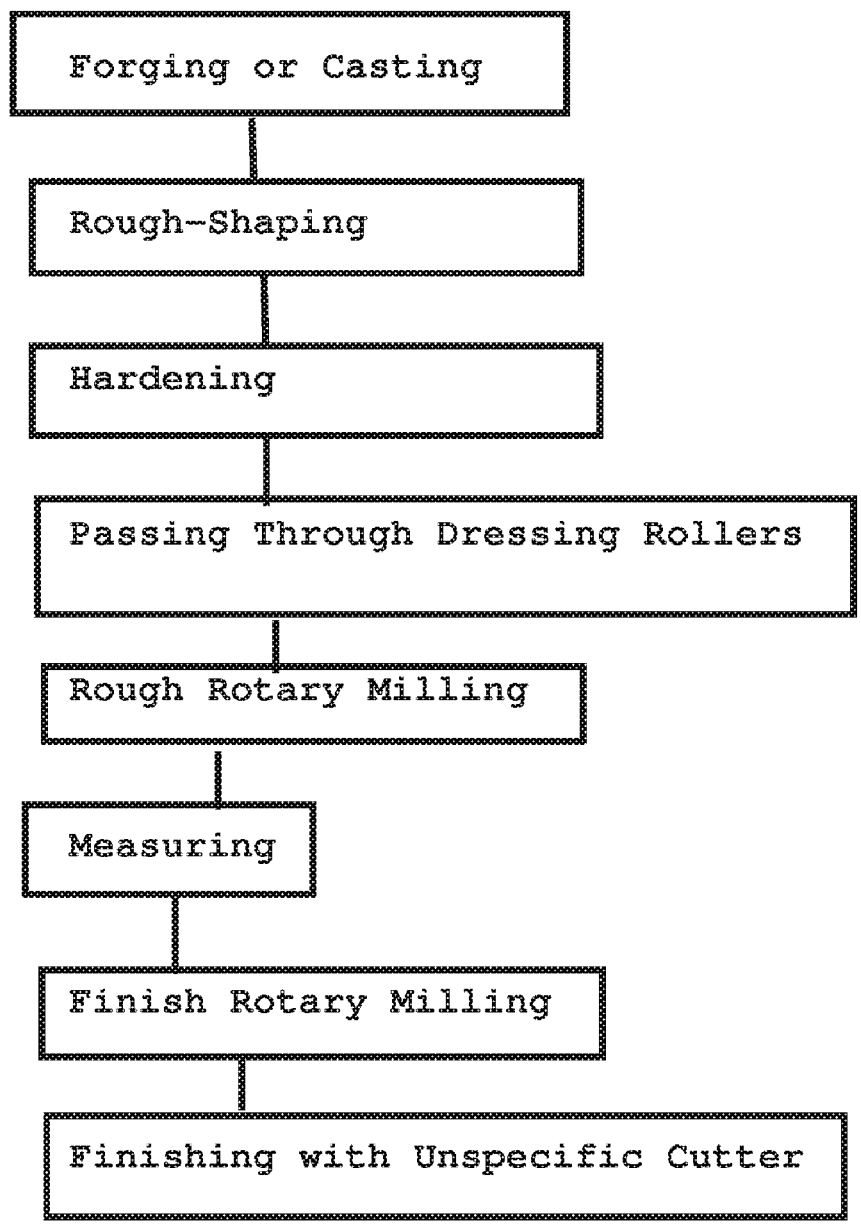

FIG. 8 shows a schematic representation of a method according to the present invention.

Crankshaft 1—rough-shaped by chip removal, hardened and passed through dressing rollers—is clamped to rotate around its main axis of rotation 2 in the machine tool (not illustrated), in which its main HL and thrust PL bearing seats will be machined. Beginning at journal 3, the main bearings HL are designated successively as HL 1 to HL 5. The numbering of the thrust bearings PL is similar. Beginning at journal 3, they are designated successively as PL 1 to PL 4 in the drawing. The end of crankshaft 1 opposite journal 3 is flange 4. In the present example, crankshaft 1 is clamped at flange 4 by a chuck, two jaws 5 of which are illustrated. As shown by the direction of arrows 6, the clamping forces act in radial direction on flange 4.

Axis of rotation 2 of crankshaft 1 is also the C axis of the machine tool running in the Z direction. Beginning at flange 4, main bearings HL 5 to HL 1 of crankshaft 1 are machined successively according to arrow 9. During machining in the direction of arrow 9, which is the X direction of the machine tool, crankshaft 1 is braced in the direction of arrow 10, which is opposite to the machining direction. Bracing in the direction of arrow 10 is accomplished by one or two steadies (not illustrated) of the machine tool. This machining of HL 5 takes place with bracing at HL 4, machining of HL 4 takes place with bracing at HL 3, machining of HL 3 takes place with bracing at HL 4 and/or HL 2, machining of HL 2 takes place with bracing at HL 3 and machining of HL 1 takes place with bracing at HL 2. Bracing during machining of thrust bearings PL 1 to PL 4 is provided in similar manner. During machining of PL 1, for example in machining direction 11, bracing is provided at HL 1 and/or HL 2. Machining of PL 2 in turn takes place with bracing at HL 2 and/or HL 3, machining of PL 3 takes place with bracing at HL 3 and/or HL 4, and finally machining of PL 4 takes place with bracing at HL 4 or HL 5. For simplicity, it is assumed that machining direction 11 corresponds to machining direction 9 and therefore to the X direction of the machine tool.

Figure 1:
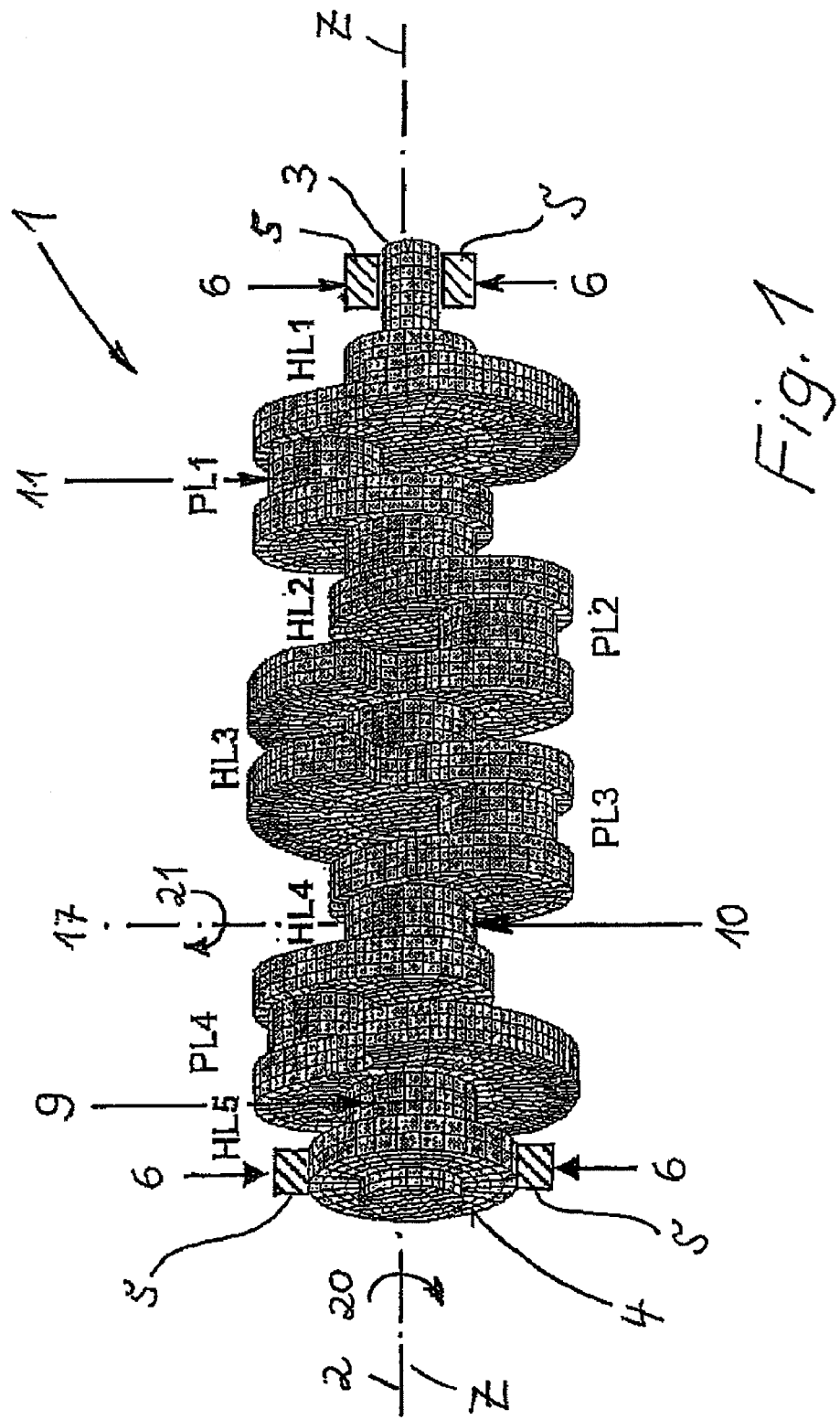
FIG. 1 shows a perspective view of a four-cylinder crankshaft.

A milling finger 12 as illustrated in FIG. 2 is provided for machining of bearing seats HL and PL. In the present practical example, diameter 13 of the milling finger is 24 mm, whereas the width of main bearing seats HL and of thrust bearing seats PL is 19 mm. Accordingly, a relief groove of 2.5 mm, in which the milling finger 12 (not illustrated) can run out, has been made on both sides of each bearing seat during rough machining of the crankshaft. Relative to its diameter 13, shank 15 of milling finger 12 has a great length 14. The great length 14 of shank 15 makes it possible that, for example, thrust bearing faces PL 1 or PL 4 can be machined from directions 9 and 11 even if—after approximately one half revolution of the crankshaft—they are located in the lower position, in which the two inner thrust bearings PL 2 and PL 3 are illustrated in FIG. 1. For this purpose, shank 15 of milling finger 12 has high flexural strength. Shank 15 is inserted into a standard tool holder 16 of the tool spindle (not illustrated) of the machine tool. Axis of rotation 17 of milling finger 12 is also parallel to the X direction of the machine tool.

Viewed from the direction of arrow A (FIG. 3), milling finger 12 is provided with three cutting tips 18, which are distributed uniformly over the circumference. Cutting tips 18 are made of cubic boron nitride, abbreviated as CBN. Each of cutting tips 18 has a slight chamfer 19 toward axis of rotation 17.

FIG. 5 shows a section through an arbitrary main bearing HL of crankshaft 1. The C axis of the machine tool lies in the same direction as axis of rotation 2; accordingly, the Z axis, which coincides with the C axis, runs perpendicular to the plane of the drawing. The X axis extends orthogonally relative thereto, and in turn the Y axis extends orthogonally relative to the X axis and to the Z axis. Relative to the X axis, axis of rotation 17 of milling finger 12 is offset in Y direction by eccentricity e, which in the present practical example amounts to approximately 4 to 5 mm. The direction of rotation of crankshaft 1 is indicated by curved arrow 20, and the direction of rotation of milling finger 12 is indicated by curved arrow 21.

Machining allowance 22 (for example, 0.35 mm) is provided for multi-stage rotary milling machining of main bearing HL. During rough cutting, in which crankshaft 1 performs approximately one complete revolution in direction 20, an outer layer 23 with a predetermined thickness (rough machining allowance, for example 0.25 mm) is removed from main bearing HL. Immediately thereafter, or in other words without reclamping of crankshaft 1, once bearing HL has been gauged after rough cutting, inner layer 24 (finish machining allowance, for example 0.1 mm) is removed by precision cutting, during which crankshaft 1 is rotated once again in direction of rotation 20 and milling finger 12 is rotated in direction of rotation 21. Reversal of directions of rotation 20 and 21 for precision cutting is not provided, but is entirely possible. During precision cutting, crankshaft 1 performs somewhat more than one complete revolution. Together with the range of angle of rotation for immersion of milling finger 12 at the beginning of precision rotary milling machining, milling finger 12 is engaged here over an angular interval of approximately 420°.

By means of a vector diagram, FIG. 5a illustrates the relative feed during immersion (dashed) of milling finger 12 in the material, or in other words during the lead-in cut, during rotation (solid) and during exit (dot-dash) of the milling finger. Because of the geometric relationships (eccentricity e, bearing diameter, diameter of the milling finger, cutter geometry, etc.), no purely tangential relative feed takes place during rotation; instead, a radial component 36—illustrated in exaggerated size—is superposed on tangential component 35, resulting in relative feed 37 illustrated in vector form during rotation. During the lead-in cut, infeed movement 38 of milling finger 12 along its longitudinal axis (in X direction) is added thereto. The relative feed resulting from superposition with vector 37 during the lead-in cut is illustrated by the corresponding lead-in cut or immersion vector 39. During exit of milling finger 12 after complete revolution of the crankshaft 1, infeed movement 40—which takes place in X direction—of milling finger 12 is added to relative feed 37. The relative feed resulting from superposition with vector 37 during exit of milling finger 12 is illustrated by the corresponding exit vector 41. The respective size of infeed movements 38 and 40 is determined experimentally in advance. At that time, direction of rotation 20 of crankshaft 1 either in or opposite to the direction of offset e of milling cutter axis 17 relative to shaft axis 2 must be taken into consideration. As reference point for determination of the order of magnitude of the infeed speed as a function of the other machining parameters as well as of the geometric relationships, there can be used the fact that the lead-in cut preferably extends over an angular interval of 3° to 15° of rotation of the crankshaft.

As already mentioned, crankshaft 1 is braced by one or two steadies (not illustrated) of the machine tool during multi-stage rotary milling machining of a main bearing HL. Bracing is provided primarily in the X direction, which is illustrated in vertical direction in FIG. 6. A sliding block 25, which is movable in both directions 26 along the X axis, is used for bracing. In addition to bracing in the X direction by sliding block 25, additional bracing is provided by two further sliding blocks 27 and 28, which can be moved respectively in radial directions 29 toward and back away from main bearing seat HL of crankshaft 1. A mechanism (not illustrated) of the steady coordinates the three movements 26 and 29 in such a way that sliding blocks 27 and 28 move onto main bearing HL, while sliding block 25 moves upward in the direction of double arrow 26. Conversely, sliding blocks 27 and 28 move away from main bearing HL in the direction of double arrows 29, while sliding block 25 moves downward in the direction of double arrow 26. A mechanism that is known in itself and that does not have to be further described here provides for coordination of movements 26 and 29.

However, bearing seat 30 of main bearing HL is also interrupted by an oil bore 31. Disturbances can be caused by the rim of this oil bore 31, and they appear during rotation of crankshaft 1, while main bearing HL is being braced by sliding blocks 25, 27 and 28. To avoid such disturbances, sliding blocks 25, 27 and 28 are each provided with a groove 32. The effect of groove 32 is that the bracing portion 33 of the total supporting face of sliding blocks 25, 27 and 28 is smaller than their respective cross-sectional face turned toward main bearing HL during bracing. What is not illustrated in the drawing is the possible adaptation of the sliding blocks to the generating line of the bearing seat to be manufactured by means of hollow grinding (see hereinabove).

The invention claimed is:

1. A method for machining the bearing seats of a crankshaft, wherein the bearing seats are subjected to the following machining operations after a crankshaft having a longitudinal axis has been initially formed by forging or casting:
   rough-shaping by chip-removing machining with specific cutters,
   hardening,
   passing through dressing rollers,
   rough rotary milling and finish rotary milling via a milling cutter,
   wherein the rough rotary milling and the finish rotary milling are respectively applied substantially during one complete revolution of the crankshaft, without longitudinal feed, and without tangential feed, relative to a tangential surface of the respective bearing seat, of the milling cutter, and the infeed of the milling cutter during immersion at the beginning of the rough rotary machining and at the beginning of the finish rotary machining has only an axial component relative to the rotation axis of the milling cutter.

2. A method according to claim 1 characterized in that the finish rotary milling is followed by finishing with an unspecific cutter.

3. A method according to claim 1, characterized in that the lead-in cut during immersion of the milling cutter extends over a crankshaft angle of rotation of 3 degree to 15 degree, and each rotary milling takes place with an offset of the rotation axis of the milling cutter relative to the central axis of the respective bearing seat equal to approximately 0.15 to 0.2 times the value of the diameter of the milling cutter.

4. A method according to claim 3, characterized in that the lead-in cut during immersion of the milling cutter extends over a crankshaft angle of rotation of approximately 5 degrees.

5. A method according to claim 1, characterized in that a relief groove is made during the rough-shaping on both sides of the respective bearing seat to be produced.

6. A method according to claim 1, characterized in that there are machined the bearing seats of the crankshaft, which is clamped for the rotary milling at a flange end thereof in a first rotatable chuck and at a journal end thereof in a second rotatable chuck, and the diameter of the milling cutter used for the rotary milling is approximately 1.15 to 1.35 times the amount of a width of the bearing seat to be machined.

7. A method according to claim 1, characterized in that, for machining of main ones of the bearing seats, each individual main bearing seat is semifinish-machined successively with a single rotary milling tool, while the crankshaft is braced simultaneously in a radial direction thereof by a steady on a respective adjacent main bearing, and, during machining of thrust bearing seats of the crankshaft, each individual thrust bearing seat is semifinish-machined successively with a single rotary milling tool, while the crankshaft is braced simultaneously in a radial direction thereof by a steady on a respective adjacent main bearing.

8. A method according to claim 1, characterized in that the finish rotary milling embraces an angle of rotation of the crankshaft larger than 360 degree, and the beginning of metal cutting during the rough rotary milling and/or during the finish rotary milling takes place in the region of an oil bore.

9. A method according to claim 1, characterized in that, after the rough milling, there is undertaken the measurement of the diameter of bearing seats of main and thrust bearings and, thereafter, the infeed for the finish milling via an NC controller of a machining machine.

\* \* \* \* \*